United States Patent
Pacher et al.

(10) Patent No.: US 10,325,521 B2
(45) Date of Patent: Jun. 18, 2019

(54) APPARATUS AND METHOD FOR DEMONSTRATING THE VISUAL IMPRESSION FOR A WEARER OF SPECTACLES HAVING POLARIZING SPECTACLE LENSES

(71) Applicants: Carl Zeiss Vision International GmbH, Aalen (DE); Carl Zeiss AG, Oberkochen (DE)

(72) Inventors: Peter Pacher, Roth (DE); Dieter Braunger, Essingen (DE)

(73) Assignees: Carl Zeiss Vision International GmbH, Aalen (DE); Carl Zeiss AG, Oberkochen (DE)

(*) Notice: Subject to any disclaimer, the term of this patent is extended or adjusted under 35 U.S.C. 154(b) by 269 days.

(21) Appl. No.: 14/672,197

(22) Filed: Mar. 29, 2015

(65) Prior Publication Data
US 2015/0206455 A1    Jul. 23, 2015

Related U.S. Application Data

(63) Continuation of application No. PCT/EP2013/069711, filed on Sep. 23, 2013.
(Continued)

(30) Foreign Application Priority Data
Sep. 28, 2012 (DE) .................. 10 2012 217 841

(51) Int. Cl.
*G02B 27/26* (2006.01)
*G02C 7/12* (2006.01)
(Continued)

(52) U.S. Cl.
CPC ............. *G09B 23/22* (2013.01); *G01M 11/02* (2013.01); *G01M 11/0264* (2013.01); *G02B 27/26* (2013.01); *G02C 7/12* (2013.01)

(58) Field of Classification Search
CPC ............. G02B 27/283; G02B 27/2241; G02B 27/2228; G02B 27/26; G02B 27/286;
(Continued)

(56) References Cited

U.S. PATENT DOCUMENTS 5,142,642 A * 8/1992 Sudo ................. H04N 13/0048
   348/47
5,331,358 A    7/1994 Schuerle et al.
(Continued)

FOREIGN PATENT DOCUMENTS

DE    199 47 775 A1    5/2000
DE    100 07 020 A1    8/2001
(Continued)

OTHER PUBLICATIONS

International Preliminary Report on Patentability dated Apr. 9, 2015 of international application PCT/EP2013/069711 on which this application is based.
(Continued)

*Primary Examiner* — Jie Lei
(74) *Attorney, Agent, or Firm* — Walter Ottesen, P.A.

(57) ABSTRACT

The invention is directed to an apparatus for demonstrating the visual impression for a wearer of spectacles having polarizing spectacle lenses. The apparatus includes a memory for providing a first image having a motif and a first polarization direction corresponding thereto and a second image having the same motif and a second polarization direction corresponding thereto, which is different from the first polarization direction. The apparatus also includes a display device for displaying the first image with light
(Continued)

polarized in the first polarization direction and the second image with light polarized in the second polarization direction in a superposed representation, such that the motif of the first image and the motif of the second image coincide dimensionally identically. The invention is also directed to a method for demonstrating the visual impression for a wearer of spectacles having polarizing spectacle lenses.

24 Claims, 13 Drawing Sheets

Related U.S. Application Data

(60) Provisional application No. 61/707,090, filed on Sep. 28, 2012.

(51) Int. Cl.
   *G09B 23/22* (2006.01)
   *G01M 11/02* (2006.01)

(58) Field of Classification Search
   CPC ............ G02B 5/3083; H04N 13/0409; H04N 13/0497; H04N 13/0239; H04N 13/0242; H04N 13/0434; H04N 9/3197; G02C 7/12; G09B 23/22; G01N 11/02; G01N 11/0264; G01M 11/02; G01M 11/0264
   USPC ..... 359/462, 464, 465, 466, 486.01, 489.01, 359/489.11; 345/6, 32, 88; 348/42, 348/46–48, 51, 57, 58
   See application file for complete search history.

(56) References Cited

U.S. PATENT DOCUMENTS

| | | |
|---|---|---|
| 5,638,082 A | 6/1997 | Grimm |
| 2006/0203338 A1 | 9/2006 | Pezzaniti |
| 2012/0002281 A1 | 1/2012 | Inoue et al. |

FOREIGN PATENT DOCUMENTS

| | | | |
|---|---|---|---|
| DE | 10 2004 054 064 A1 | 5/2006 | |
| GB | 747235 A | 3/1956 | |
| WO | 92/19149 A1 | 11/1992 | |

OTHER PUBLICATIONS

International Search Report dated Dec. 10, 2013 of international application PCT/EP2013/069711 on which this application is based.
English translation of the Office action of the German Patent Office dated Jul. 3, 2013 in German patent application 10 2012 217 841.4 on which the claim of priority is based.
DIN ISO 13666 "Augenoptik-Brillenglaeser Vokabular"(ISO 13666:1998), DIN Deutsches Institut fuer Normung, e. V., pp. 1 to 53, Nov. 1998.
DIN EN 1836 Personal eye-equipment—Sunglasses and sunglare filters for general use and filters for direct observation of the sun (includes Amendment A1:2007) English version of DIN EN 1836:2007-11, DIN Deutsches Institut fuer Normung, e. V., pp. 1 to 43, Nov. 2007.
ISO 8980-2, "Ophthalmic optics—Uncut finished spectacle lenses—Part 2: Specifications for progressive power lenses", Reference No. ISO 8980-2:2004(E), copyright ISO 2004, pp. 1 to 8, Second edition Feb. 1, 2004.
Office action and translation into English of the Office action of the German Patent Office dated Feb. 1, 2018 in German patent application 10 2012 217 841.4 on which the claim of priority is based.

* cited by examiner

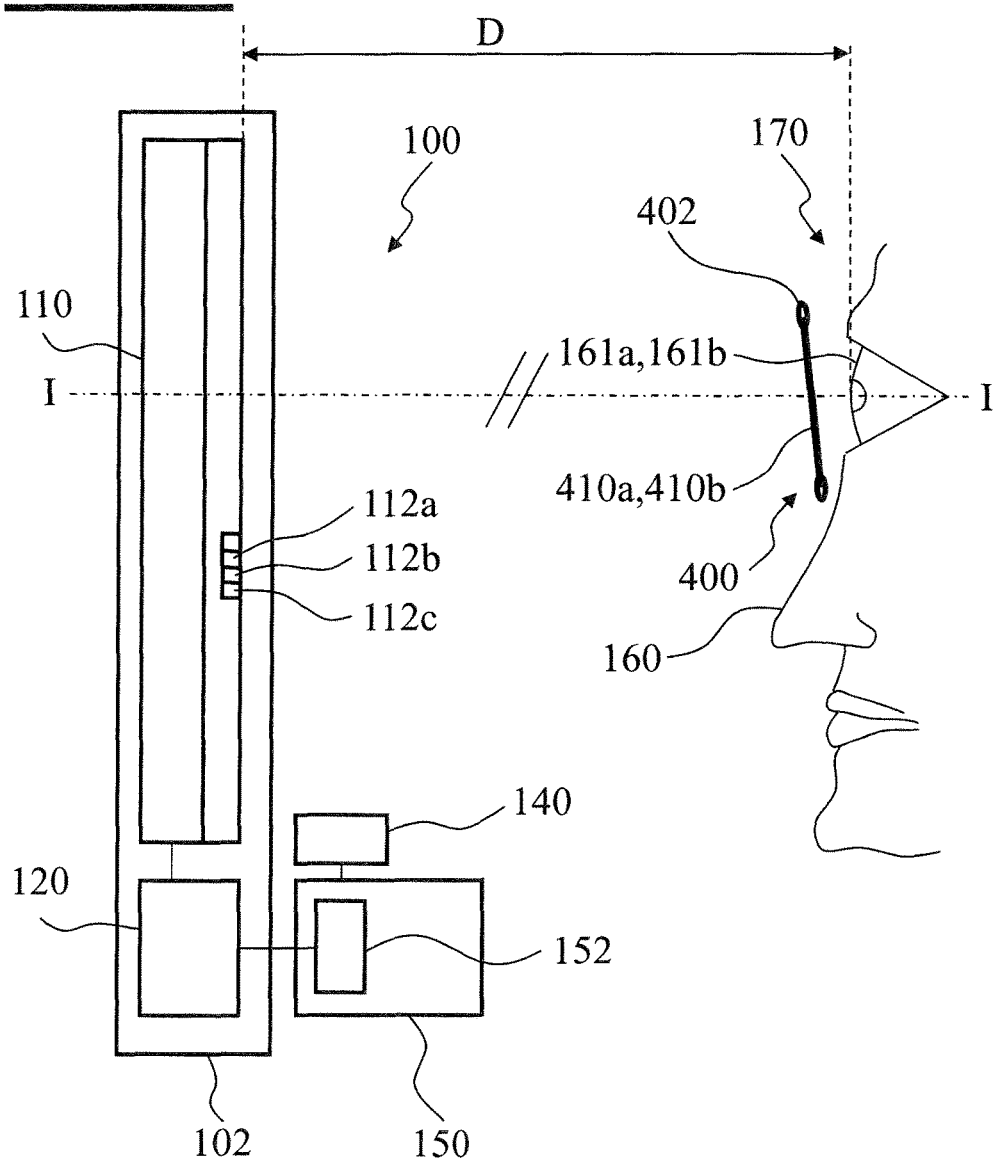
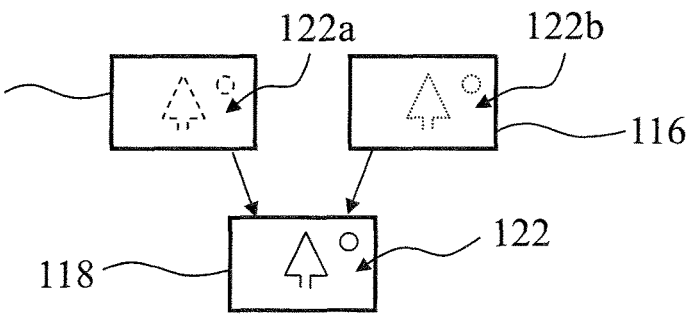

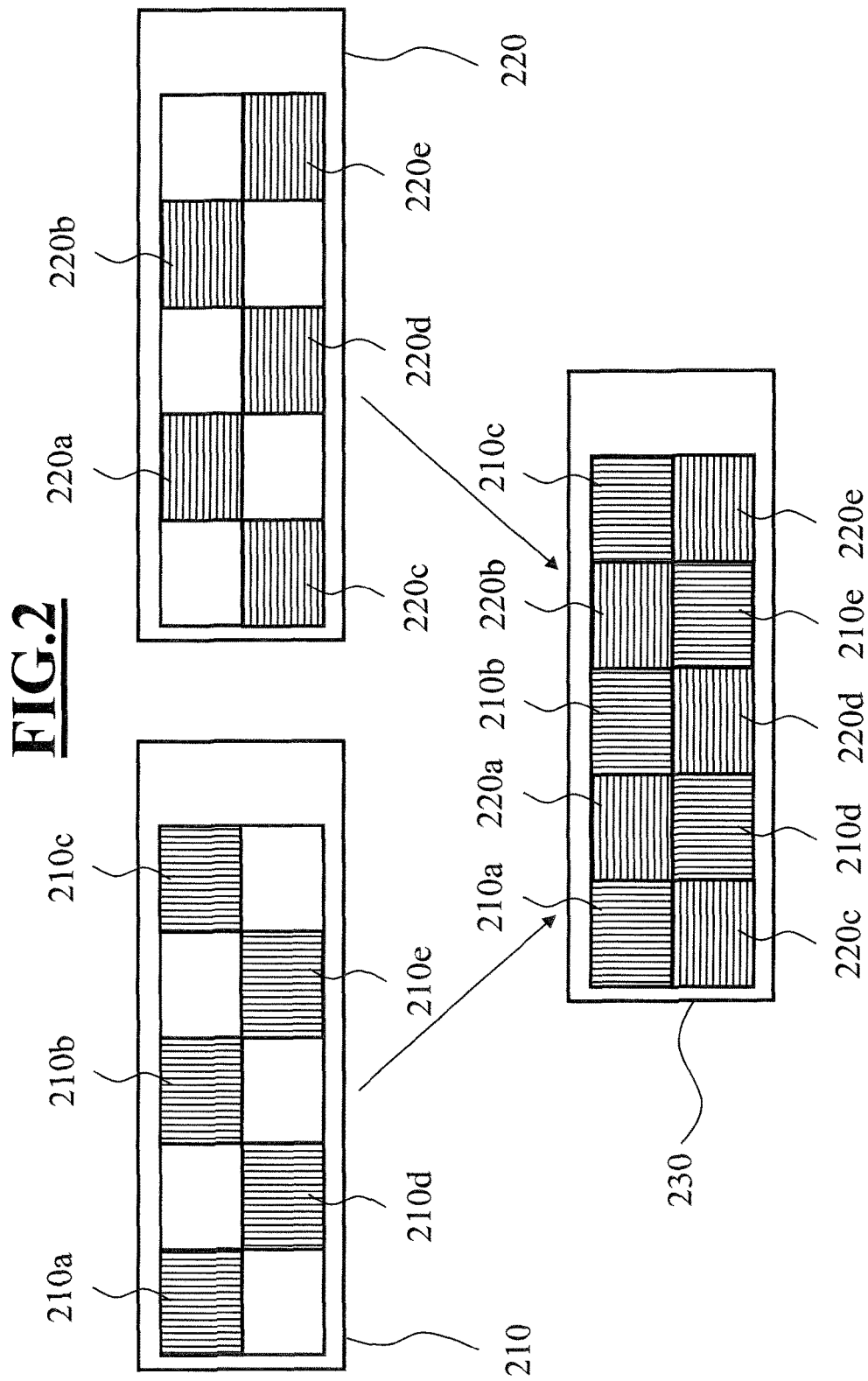

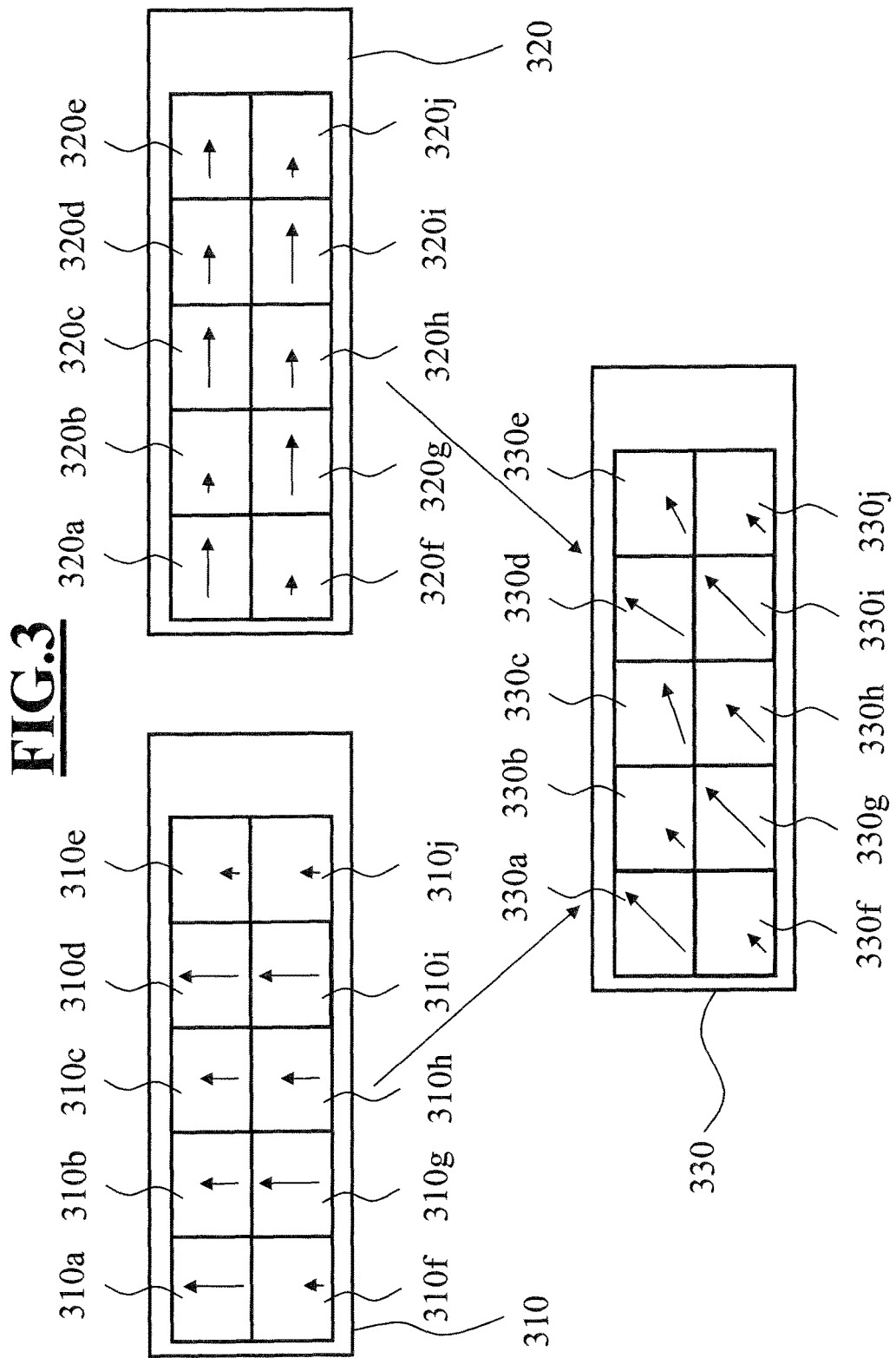

FIG.7A

FIG.7B
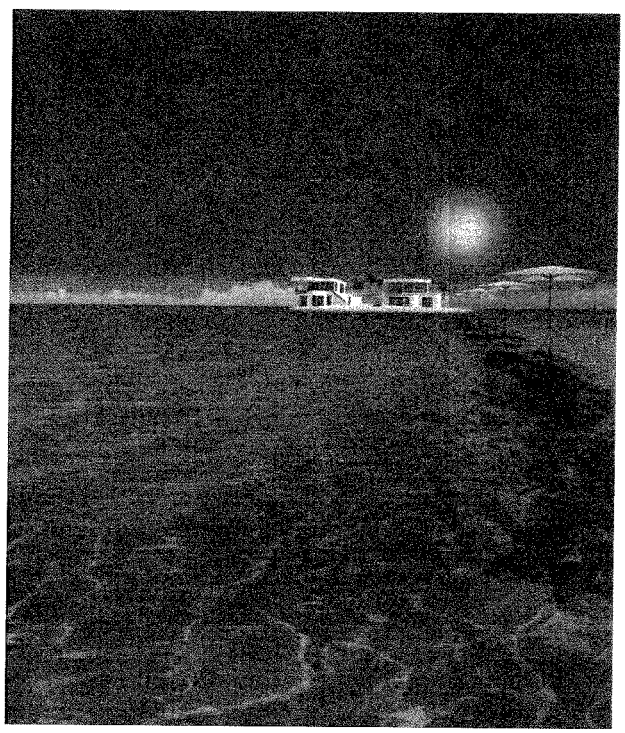

FIG.8A
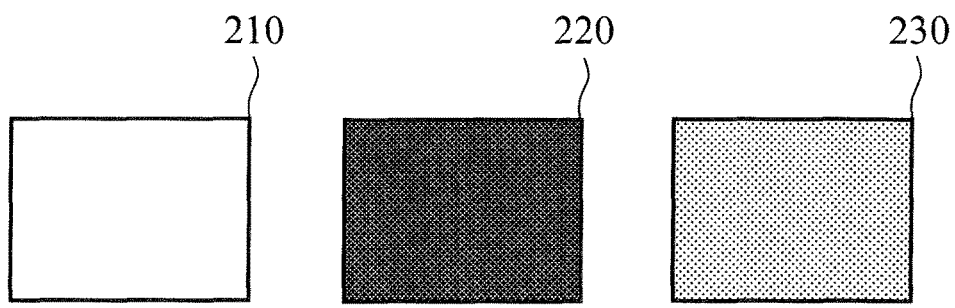
FIG.8B  FIG.8C  FIG.8D
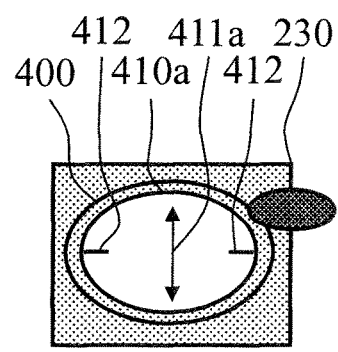 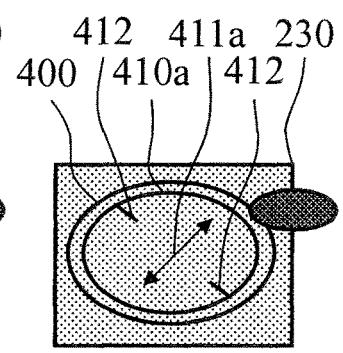 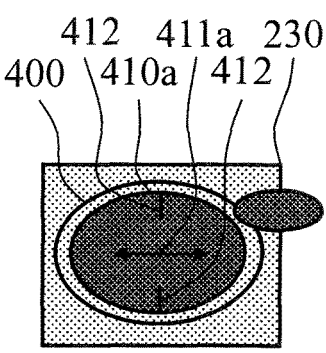
FIG.8E
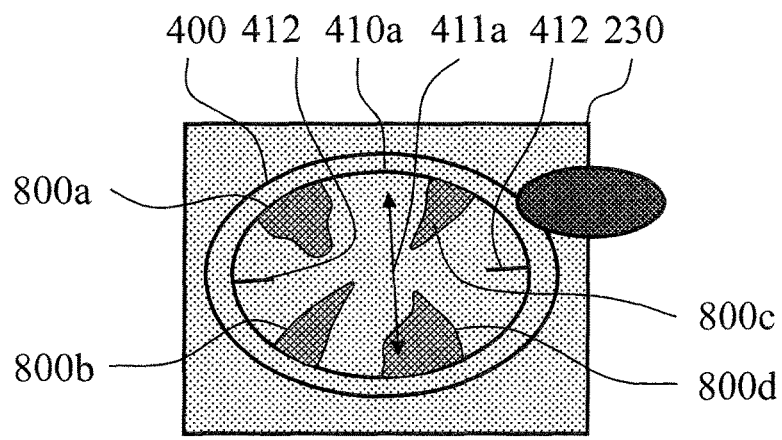

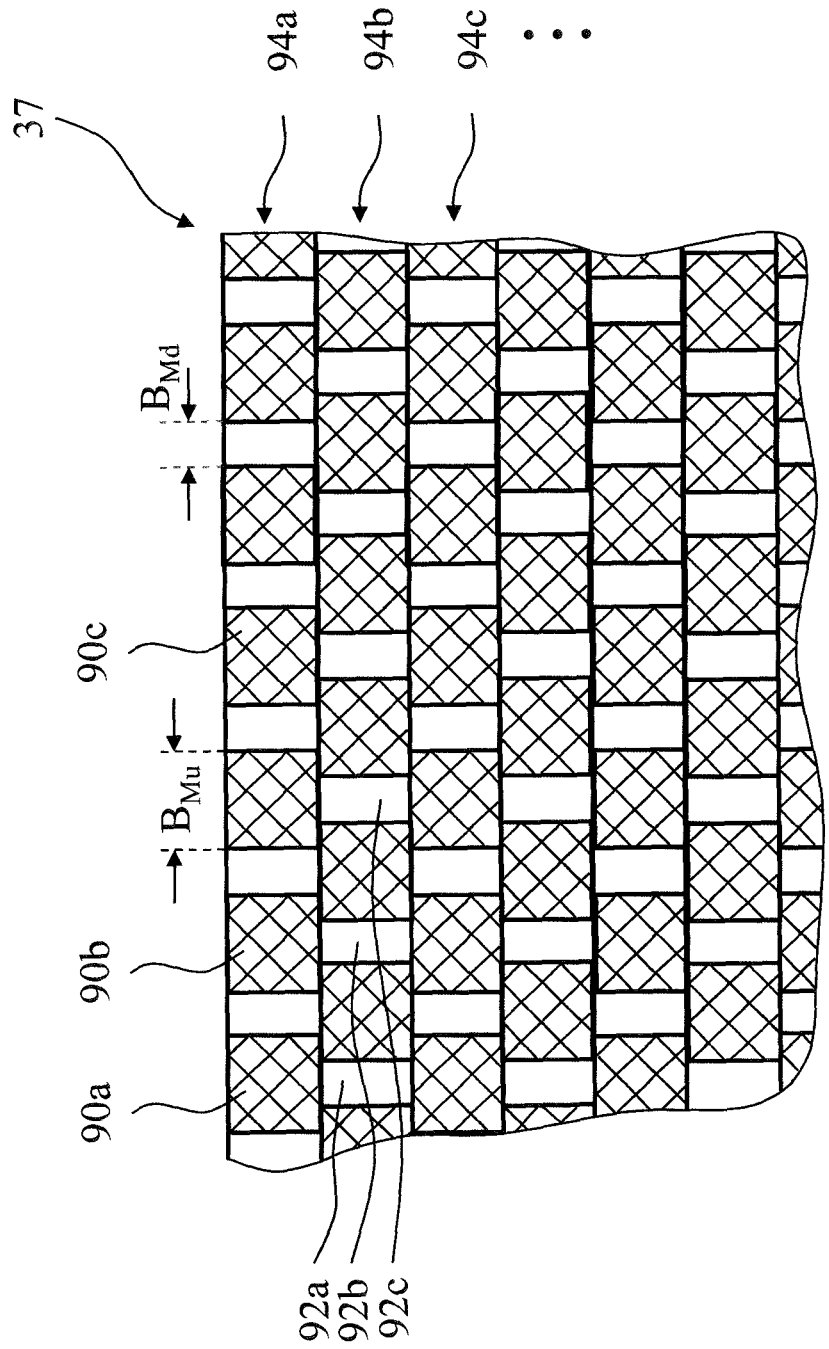

APPARATUS AND METHOD FOR DEMONSTRATING THE VISUAL IMPRESSION FOR A WEARER OF SPECTACLES HAVING POLARIZING SPECTACLE LENSES

CROSS REFERENCE TO RELATED APPLICATIONS

This application is a continuation application of international patent application PCT/EP2013/069711, filed Sep. 23, 2013 which designates the United States and claims priority from U.S. Provisional Application No. 61/707,090 filed Sep. 28, 2012, and German patent application 10 2012 217 841.4 filed Sep. 28, 2012. The present continuation application claims priority to each of the above applications and incorporates herein the entire contents thereof by reference.

FIELD OF THE INVENTION

The invention relates to an apparatus for demonstrating the visual impression for a wearer of spectacles including polarizing spectacle lenses and to a method for demonstrating the visual impression for a wearer of spectacles including polarizing spectacle lenses.

BACKGROUND OF THE INVENTION

In the context of the present invention, spectacle lenses are understood to mean all types of optical corrective lenses and also lenses without optical correction which are part of spectacles and through which the wearer of spectacles looks during use as intended. There are spectacle lenses composed of plastic and those composed of mineral glass.

Polarization describes the direction of vibration of an electromagnetic wave. Natural light is usually perceived in an unpolarized manner as a superposition of different waves of electromagnetic radiation having different vibration planes and phases. After reflection at an interface, the reflected light partly has a polarization direction.

A polarizing spectacle lens is defined in DIN EN ISO 13666 (1998) as a spectacle lens having different light absorption depending on the polarization of the impinging light. The orientation of the maximum transmission of the electric field vector of the electromagnetic radiation through a polarizing spectacle lens is designated as the polarization axis of the spectacle lens. The position of the polarization axis in the frame is specified in degrees (°), wherein 0° describes a horizontal orientation and 90° a vertical orientation of the polarization axis. The transmission plane of a polarizing spectacle lens is defined as a plane which intersects the spectacle lens and contains the direction of propagation of the transmitted radiation and is parallel to the orientation of the maximum transmission of the electric field vector of the transmitted radiation. The polarization plane of a polarizing spectacle lens is normal to the transmission plane and is often identified by markings on a polarizing spectacle lens. A set-up for determining the polarization plane is shown for example in DIN EN ISO 8980-3:2004 or DIN EN 1836:2005+A1:2007 (D).

There are spectacle lenses which permanently have a preferably predetermined polarizing property, and those in which the polarizing property can change. The latter also include so-called phototropic spectacle lenses. Part of such spectacle lenses is a phototropic material, for example, in the form of a coating or in the form of additives to the spectacle lens body. A phototropic material is a material which changes its light transmission properties reversibly depending on the irradiance and the wavelengths of the impinging radiation. In this case, the alteration of the light transmission properties can purely alter the absorption or alternatively produce a polarizing effect.

In the case of polarizing spectacles, the two polarizing spectacle lenses are fixedly incorporated in a frame. This should be understood to mean that there is a mechanically fixed connection between the frame and the spectacle lenses. Therefore, full rim frames, semi-rimless frames, rim frames and also rimless frames can be provided for fixing the spectacle lenses.

Polarizing spectacle lenses are principally used in sunglasses. In the case of such polarizing spectacle lenses, which are intended to reduce glare from the sun, the transmission plane is normally oriented vertically, and the polarization plane horizontally, for the reasons given below.

As is known, the so-called Brewster angle is the angle with respect to the normal to an interface at which incident light is reflected such that only the portions polarized parallel to the interface (that is, perpendicularly to the plane of incidence) are reflected (s-polarized). In the case of a horizontal interface (such as a water surface, for example), light reflected at this angle is therefore horizontally polarized. At other angles deviating from the Brewster angle, the reflected light additionally has polarized portions lying in the plane of incidence (p-polarized). In the case of polarizing spectacles such as sunglasses, for example, comprising polarizing spectacle lenses, the polarization axis is oriented vertically (90°) and the polarization plane is oriented horizontally (0°). Spectacle lenses having a vertical polarization axis or horizontal polarization plane are therefore transmissive to vertically polarized light. Reflections on horizontal surfaces (such as water surfaces, for example) are thus greatly reduced for the wearer of spectacles.

Polarizing spectacles consist of two polarizing spectacle lenses fixedly incorporated in a frame, wherein the two defined polarization planes of the two polarizing spectacle lenses according to DIN EN 1836:2005+A1:2007 should not deviate from one another by more than 6°.

DIN EN 1836:2005+A1:2007 (D) furthermore provides that the polarization plane in the case of sunglasses must not deviate from the horizontal by more than +/−5°. That means that polarizing spectacle lenses have to be incorporated in the frame in such a way that the polarization axis thereof does not deviate from the vertical by more than +/−5°. Such sunglasses are described for example in GB747 235.

The degree of polarization or the polarization efficiency quantifies the quality of the polarization of a spectacle lens. The terms degree of polarization and polarization efficiency are often regarded as equivalent in the literature. The degree of polarization and the polarization efficiency are defined in DIN EN 1836 and DIN EN ISO 13666. The degree of polarization P is defined as $P=(I_{max}-I_{min})/(I_{max}+I_{min})$, wherein $I_{max}$ and $I_{min}$ denote the extremes of the light transmittance I. In order to determine the degree of polarization, the polarizing spectacle lens is irradiated on one side with 100% linearly polarized light having a defined polarization plane and having an intensity. On the opposite side of the polarizing spectacle lens, it is possible to measure the intensity depending on the angular position of the polarizing spectacle lens relative to the defined polarization plane. For a specific angle, the maximum $I_{max}$ of the light transmittance I will attain a maximum. This angle is designated by the polarization axis. At this angular position, every plane parallel to the defined polarization plane of the incident light is a transmission plane of the polarizing spectacle lens. At a different angle, the minimum value $I_{min}$ of the light transmittance I occurs. $I_{min}$ usually occurs at an angle which deviates by 90° with respect to the polarization axis. At this angular position, every plane parallel to the defined polarization plane of the incident light is a polarization plane of the polarizing spectacle lens. The indication of the polarization ratio $R=I_{max}/I_{min}$ can also be used for assessing the quality of polarizing spectacle lenses.

Polarizing spectacle lenses pursuant to DIN EN 1836: 2005+A1:2007 (D) and DIN EN ISO 8980-3:2004 must have a ratio between maximum and minimum light transmission of greater than 8:1 and greater than 4:1, respectively. Polarizing spectacle lenses thus achieve a degree of polarization of 78% and 60%, respectively. High-quality lenses have a degree of polarization of more than 99%.

However, such characteristic figures are variables which a wearer of spectacles can comprehend only with difficulty. Without their own comparison values or values from experience or without knowledge of the significance of the characteristic figures, in general it is virtually impossible for the wearer of spectacles to differentiate high-quality spectacle lenses from lower-quality spectacle lenses.

Therefore, in order to demonstrate the polarizing property of, for example, sunglasses comprising polarizing spectacle lenses, nowadays use is often made of stickers or small emblems which reflect light with a defined polarization direction. In this case, the wearer of spectacles can view the stickers or emblems through polarizing spectacle lenses. If the stickers or emblems are rotated relative to the polarizing spectacle lenses in a frame, then a change in intensity is apparent which does not occur in the case of non-polarizing spectacle lenses. By this means, however, no statement whatsoever about the quality of polarizing spectacle lenses in a frame can be made, but rather only a simple differentiation between polarizing spectacle lenses in a frame and non-polarizing spectacle lenses in a frame.

Further demonstrators are based on a simulated reflection being superposed on a test image by means of semi-transmissive film. When the demonstrator is viewed through polarizing spectacles, the intensity of the simulated reflection is greatly reduced and the original image can be seen with increased contrast. No differentiation of quality is possible in this case either. Moreover, demonstrators of this type exhibit only a single test image, which possibly does not correspond to the use conditions of the wearer of spectacles.

The prior art furthermore discloses vision testing instruments which display optotypes with polarized light having different polarization directions with the aid of optotype charts or displays. In use as intended, a subject wears spectacles comprising two differently polarized spectacle lenses, wherein the polarization axes of the two spectacle lenses are perpendicular to one another. What is achieved by this means is that the subject can perceive a displayed optotype or parts thereof only with one eye and other parts only with the other eye.

A vision testing instrument of this type is known from U.S. Pat. No. 5,331,358, for example. The vision testing instrument substantially consists of two polarization films and two liquid crystal displays, which are arranged alternately. This arrangement is able to influence the light coming from a light source such that optotypes or parts thereof can purposefully be seen only by one eye or else by both eyes. The light from the light source firstly illuminates the first, color-neutral, transparent polarization film. The light passing through the first polarization film penetrates through the first, if appropriate colored, display and illuminates the second, color-neutral polarization film. The light passing through the second polarization film penetrates through the second display, after which the light leaves the vision testing instrument. A vision testing instrument of this type can then be used to represent figures and drawings by virtue of the individual liquid crystal cells being driven. If the optotype represented is intended to be altered, then a corresponding command is given to a switching device via a keyboard, which switching device drives the two driver circuits of the two displays in a desired manner.

U.S. Pat. No. 5,638,082 describes a vision testing instrument substantially consisting of at least one vectograph film with many individual polarization elements and at least one screen. The polarization elements are arranged in strip-shape fashion, wherein the polarization elements of a strip have the same polarization direction. The polarization elements in the strips arranged alongside one another have polarization axes perpendicular to one another. It is explicitly noted in the publication that the liquid crystal displays normally consist of several hundred by several hundred LCD elements, such that no strips are visible when the observer is at a sufficiently large distance from the display.

DE 199 47 775 A1 describes a test device similar to the type described in U.S. Pat. No. 5,638,082. Horizontal pairs of lines arranged one above another are presented to the subject's eyes, wherein the test device respectively provides only one line for one eye and the other line for the other eye.

DE 100 07 020 A1 relates to a near vision testing instrument for displaying optotype charts. One or more optotypes for testing the visual faculty of the user is or are arranged on each optotype chart. An optotype chart shows a stereo test that checks the subject's spatial perception. On account of the differently polarized triangles offset horizontally, the latter appear spatially offset with respect to a point which is arranged in the center of the optotype chart, is represented black and is perceptible to both eyes.

These vision testing instruments are configured for spectacles comprising polarizing spectacle lenses whose polarization axes form an angle that differs from zero, usually a 90° angle. Although an optotype currently displayed by the display of the respective vision testing instrument can bring about a different visual impression for the wearer of spectacles comprising polarized spectacle lenses having polarization axes oriented parallel, depending on the quality of the polarization properties, the wearer of spectacles generally cannot assess on the basis of the visual impression whether they are wearing high-quality or low-quality spectacles.

United States patent application publication 2006/0203338 A1, from which the invention proceeds, describes a stacked display for representing three-dimensional images and videos. Two superposed, polarized image patterns are generated, which differ by virtue of different polarization planes. The two image patterns bring about a three-dimensional visual impression for the observer as a result of simultaneous viewing through spectacles comprising polarized spectacle lenses having polarization axes that differ by 90°. A three-dimensional visual impression can be generated only if the two image patterns show an object from different perspectives. The two image patterns are therefore not congruent. The motifs of the two image patterns are therefore not identical. If the display is viewed using spectacles comprising polarized spectacle lenses having polarization axes oriented parallel to one another, either only one of the two image patterns is perceived by one of the two eyes, specifically if the polarization direction of the light from this image pattern precisely coincides with the orientation of the polarization axis of the spectacle lenses, or both image patterns are perceived simultaneously by both eyes, which brings about a blurred visual impression because the two motifs are not identical and not congruent. A statement about the quality of the polarized spectacles is not possible.

SUMMARY OF THE INVENTION

It is an object of the invention to provide an apparatus and a method for demonstrating the visual impression for a wearer of spectacles including polarizing spectacle lenses by means of which the quality and functionality of the polarizing spectacles can be checked both for the purchaser and for the vendor.

The apparatus according to the invention for demonstrating the visual impression for a wearer of spectacles including polarizing spectacle lenses comprises a memory for providing a first image having a motif and an associated first polarization direction, a memory for providing a second image having a motif and an associated second polarization direction, which is different from the first polarization direction, and a display device for displaying the first image with light polarized in the first polarization direction and the second image with light polarized in the second polarization direction in a superposed representation. According to the invention, the two motifs of the first and second images are the same motif. In a departure from the apparatus described in United States patent application publication 2006/0203338 A1, the first image and the second image are displayed such that the motif of the first image and the motif of the second image coincide dimensionally identically. The two motifs of the first and second images therefore correspond in terms of their size and shape and are offset neither in a lateral direction nor in the depth in a manner perceptible to the observer.

The term "superposition" also means that the images are perceived simultaneously for the observer, or to put it another way that the observer does not have the impression of the images being displayed to the observer successively. This means that each of the polarized image patterns is represented at least ten times per second, wherein this display of the individual images can indeed be carried out in alternation, as long as the human eye is not able to recognize this circumstance.

An observer perceives the two congruent motifs as a single motif with the naked eye. If the observer wears polarizing spectacles comprising two spectacle lenses having an identical polarization axis in a manner as intended, then the observer perceives the images only insofar as the latter have polarized proportions which coincide with the polarization axis of the spectacle lenses. It is thus possible, through a suitable choice of the motif and the polarization directions of the two images, to generate for the observer of the display device a visual impression corresponding to that which the observer would have if the motif were not deemed by the observer as a reproduction on the display device, but rather as the original, for example, as an actually existing object or in the form of a landscape with and possibly without the use of polarizing spectacles.

It should hereby be expressly clarified that the term "motif" should be understood in the sense of image motif, namely as the essential constituent in terms of content of an image such as, for example, a photograph or a graphic. The emphasis is on a centrally represented object (person, building, part of a landscape or situation).

An observer can be shown the effect of polarizing spectacles particularly impressively if a motif corresponding to the natural environment of the observer is presented to the latter. Such a motif may be, for example, an island rising up from the sea under a clear sky with the sun shining. An observer will perceive with the naked eye strong reflections of the sunlight on the water surface. If the observer wears polarizing sunglasses, these reflections become invisible to the observer and, if the water is clear enough, the observer can even perceive the seabed. The aim of the invention is to artificially simulate in particular this natural situation for the observer on the display device.

In principle, it is possible to generate the abovementioned motif and the two images having assigned different polarization directions artificially, for example, in the form of a computer graphic. A generally more realistic visual impression can be generated if the first image is a photographic recording from a camera with, disposed in front, a polarization filter having a first polarization axis and if the second image is likewise a photographic recording from a camera with, disposed in front, a polarization filter having a second polarization axis, which is different from the first polarization axis. It goes without saying that it is also possible for only one of the images to be a corresponding photographic camera recording and for the other image to be generated, for example, from a corresponding modification of the one image with the aid of a computer. In order to obtain the dimensional identity according to the invention of the motifs in both images, in the first case it is expedient, of course, if the two photographic recordings are captured by one and the same camera and if the settings thereof are maintained unchanged. It goes without saying that the recording direction and distance with respect to the object should also preferably be chosen to be identical in both recordings.

It is furthermore possible to represent movable motifs, that is, for example in the form of a video comprising a consecutive sequence of images of the type described above. Such a movable motif can be generated, for example, by a moved camera. In particular, a sequence of different viewing situations can thus be demonstrated temporally successively.

In order to obtain the dimensional identity of the motifs in both image sequences that is required according to the invention, it is expedient, of course, if the two video recordings corresponding to one another are captured simultaneously by two video cameras with, respectively disposed in front, polarization filters having respectively differently oriented polarization axes and if the settings thereof are chosen to be identical. It goes without saying that the recording direction and distance with respect to the object should also preferably be chosen to be identical for both video recordings, which is implemented by means of a mechanical connection of the two video cameras and rigid alignment with the same motif.

As an alternative to the use of two (video) cameras or one (video) camera with (video) image recording carried out (consecutively sequentially) in alternation with a polarization filter having a first polarization axis orientation and with a polarization filter having a second orientation of the polarization axis, which deviates from the first orientation of the polarization axis, it is also possible to use a single (video) camera, in front of which is disposed a polarization filter having locally differently oriented polarization axes. To put it another way, the polarization filter has at various locations a polarization axis oriented in a first direction and at other locations a polarization axis oriented in a different direction, deviating from the first direction. These locations having different polarization axis orientations can be arranged, for example, in a manner corresponding to the light and dark fields of a checkerboard (that is, light field=filter effect with first polarization axis direction and dark field=filter effect with second polarization axis direction) or in strip-like fashion in alternation.

In order to demonstrate the effect of polarizing spectacles to an observer, it would be possible, in principle, to use exactly the same image as first and second images because the brightness decreases with the polarizing spectacles compared with viewing with the naked eye. However, the difference in the visual impression with and without polarizing spectacles can be shown particularly well if the first image and the second image differ in at least one optical property, in particular in at least one of the optical properties from the group contrast, brightness, saturation and hue. Knowledge about the decisiveness of these properties is helpful particularly if at least one of the two images is not a direct photographic recording, but rather was generated from a photographic recording with the aid of technical aids, such as specific optical and/or computational filters, or if at least one of the two images was generated purely by means of computer-implemented aids.

The differentiation of the images in terms of the optical properties is particularly impressive for the observer if the images contain at least ten different brightness values and/or ten different color values. The different optical properties of the images represented are manifested specifically in the representability of reduced reflections, reduced mirroring, darker blue, visibility of a rainbow in one of the two images. The different optical properties do not encompass the image structure or different views or viewing angles of a three-dimensional object.

There are various possibilities for displaying the two images on the display device. This can depend firstly on the type of display device used and/or else on the conditioning of the images for the display thereof. There are, for example, display devices whose pixels are arranged in the manner of the fields of a checkerboard. There are also display devices whose "pixels" run in strip-shaped fashion. There are display devices in which the polarization axis of individual pixels is fixedly predefined. In other display devices, the polarization axis of all the fields can be set arbitrarily. Display devices in which the polarization axis of individual pixels is fixedly predefined can be constructed, for example, like a checkerboard pattern with light and dark fields, wherein the pixels corresponding to the light fields of the checkerboard have one polarization axis and the pixels corresponding to the dark fields have another polarization axis. In the case of display devices having a polarization axis that can be set pixel by pixel, it is then in turn possible to operate them with the aid of suitable software in the manner of display devices having a fixedly predefined polarization axis by virtue of predetermined pixels always being allocated the same polarization axis.

Pixels having a defined polarization axis should be understood to mean such pixels which all generate at least 80%, preferably at least 90%, more preferably at least 95% linearly polarized radiation, wherein the electrical vector of the radiation of the pixels is contained in a plane parallel to the polarization plane.

On the basis of this insight, the display device can be configured such that the displayed first image consists of first pixels arranged in the manner of the fields of a single one of the colors of a checkerboard pattern, and that the displayed second image consists of second pixels arranged in the manner of the fields of the other color of the checkerboard pattern. This display is suitable particularly for the case where the human eye does not perceive the individual pixels separately alongside one another during viewing, such as, for example, in the case of a computer or television screen.

However, the display device can also be configured in such a way that the first image consists of pixels arranged in the manner of all the fields of a checkerboard pattern, and that the second image consists of the same pixels, and that the respective displayed pixels contain the information of the corresponding pixel of the first image and the information of the corresponding pixel of the second image, wherein the polarization direction corresponds to the vector addition of the polarization direction vectors—taking account of the intensity—of the corresponding pixels, of the first image and of the second image.

In principle, it is possible, for the demonstration of the invention, for images which are linearly polarized in any way to be displayed in a manner superposed on one another insofar as their polarization directions differ. The polarizing effect of polarizing spectacle lenses can be shown in a particularly simple manner if the first polarization direction is perpendicular to the second polarization direction. It is thus possible, by means of corresponding positioning of the subject and known orientation of the polarization axis of the subject's polarizing spectacles, to stipulate which of the two images is perceived by the subject and which is not.

It is possible, in principle, for the display device to be embodied in such a way that an observer is given a three-dimensional visual impression. The display device must then have regions which are visible exclusively to the left eye of the observer and regions which are visible exclusively to the right eye of the observer. Each of the regions per se must then be configured for displaying a first image with light polarized in the first polarization direction and a second image with light polarized in the second polarization direction in a superposed representation, such that the motif of the first image and the motif of the second image coincide dimensionally identically. The three-dimensional visual impression is generated by virtue of the fact that the representation of the motif of the first region and of the motif of the second region do not coincide dimensionally identically.

On that side of the display device which faces the subject's eyes in the optical beam path, there is arranged for this purpose an optical assembly, which separates the light fed to the optical beam path from a first group of selected regions of the display device from the light fed to the beam path from a second group of selected regions of the display device, in order to feed the light from the first group of selected regions of the display device to the left eye of the subject and to guide the light from the second group of selected regions of the display device to the right eye of the subject.

The optical assembly for separating the light of the first and second groups of selected regions of the display device with a diaphragm system acting as a parallax barrier to embody. For this purpose, the diaphragm system can be embodied, for example, as a mask having alternately light-transmissive and light-nontransmissive regions.

The alternately light-transmissive and light-nontransmissive regions of the mask can have a checkerboard shape or a strip shape. Expediently, the checkerboard shape of the pixels and the checkerboard or strip shape of the mask are arranged or oriented parallel to one another.

In the general part of the introduction to the description it was pointed out that phototropic spectacle lenses are also counted among the polarizing spectacle lenses. In order to demonstrate the mode of action of such spectacle lenses, the invention optionally provides a light source for activating the phototropic spectacle lenses.

The method according to the invention for demonstrating the visual impression for a wearer of spectacles comprising polarizing spectacle lenses comprises the following steps:
   a) providing a first image having a motif and an associated first polarization direction,
   b) providing a second image having the same motif and an associated second polarization direction, which is different from the first polarization direction,
   c) displaying the first image with light polarized in the first polarization direction and the second image with light polarized in the second polarization direction in a superposed representation, such that the motif of the first image and the motif of the second image coincide dimensionally identically.

As already explained above with regard to the apparatus according to the invention, a photographic recording from a camera with, disposed in front, a polarization filter having a first polarization axis can be used as the first image. Alternatively or additionally, a photographic recording from a camera with, disposed in front, a polarization filter having a second polarization axis, which differs from the first polarization axis, can also be used as the second image. These can be stored, for example, together with the information about the direction of the polarization axis of the filter used as the respective associated polarization direction. The latter is not absolutely necessary, however. The respective associated polarization direction provided can also be any other arbitrary polarization direction. In order to generate a display that is as realistic as possible, however, the direction of the polarization axis and of the polarization direction will coincide (the same orientation of recorded image and displayed image is assumed, of course).

In the case of the method according to the invention, it is advantageous if the first image and the second image differ in at least one optical property, in particular in at least one of the optical properties from the group contrast, brightness, saturation and hue. The reasons have already been set out above with regard to the description of the apparatus according to the invention.

It is firstly possible that the displayed first image consists of first pixels arranged in the manner of the fields of a single one of the colors of a checkerboard pattern, and that the displayed second image consists of second pixels arranged in the manner of the fields of the other color of the checkerboard pattern, and it is furthermore possible that the first image consists of pixels arranged in the manner of the fields of a checkerboard pattern, and that the second image consists of the same pixels, and that the respective displayed pixels contain the information of the corresponding pixel of the first image and the information of the corresponding pixel of the second image, wherein the polarization direction corresponds to the vector addition of the polarization direction vectors—taking account of the intensity—of the corresponding pixels of the first image and of the second image.

Since conventional sunglasses have polarizing lenses whose polarization axes do not deviate from the vertical by more than +/−5°, it is expedient if the first polarization direction is oriented horizontally and the second polarization direction is oriented vertically. The polarization direction of one of the two images accordingly corresponds to the direction of the polarization axis of the spectacle lenses and the polarization direction of the other of the two images is perpendicular to the polarization axis. Accordingly, with polarizing spectacles the wearer of spectacles perceives only one of the images, while without polarizing spectacles the wearer sees both images in superposition. When the image generating device is viewed without polarizing spectacle lenses, the superposition of all polarized images is visible since the naked eye cannot differentiate light having different polarization directions.

The method according to the invention can comprise the following further method step:
   d) positioning a subject for viewing the displayed images in a superposed representation optionally with the naked eye and/or through spectacles comprising non-polarizing spectacle lenses and/or through the spectacles comprising the polarizing spectacle lenses.

The different visual impressions with the naked eye, through spectacles comprising non-polarizing spectacle lenses and through spectacles comprising the polarizing spectacle lenses are thus made clear to the subject and the subject will recognize the advantages of polarizing spectacle lenses.

In this context, the subject can, on demand, also be given an understanding of the functioning and the effect of phototropic spectacle lenses. Provision is therefore made for switching on as necessary a light source that activates the phototropic spectacle lenses.

The light source can be a UV lamp, for example. By means of such a UV lamp suitable for activating phototropic spectacle lenses, for example, phototropic polarizing spectacles can be irradiated with ultraviolet light for 60 seconds. The phototropic polarizing spectacles irradiated in this way exhibit polarizing properties after irradiation. A test person can then check the quality of the spectacles.

Under certain circumstances it is expedient for the lamp that is suitable for activation to be permanently luminous at least starting from the positioning of a subject, such that constant activation of the phototropic polarizing spectacle lenses is carried out.

BRIEF DESCRIPTION OF THE DRAWINGS

The invention will now be described with reference to the drawings wherein:

FIGS. 1A and 1B show one embodiment of an apparatus according to the invention with a display for demonstrating the visual impression for a wearer of spectacles including polarizing spectacle lenses:

FIG. 1A shows the structure of the apparatus; and,

FIG. 1B shows the image superposition with the apparatus;

FIG. 2 shows a first variant for the arrangement of polarizing pixels in the display of the apparatus according to FIGS. 1A and 1B;

FIG. 3 shows a second variant for the arrangement of polarizing pixels in the display of the apparatus according to FIGS. 1A and 1B;

FIG. 4A shows the spectacles with frame and spectacle lens horizontal;

FIG. 4B shows the polarization effect of a polarizing spectacle lens in perspective illustration;

FIG. 4C shows the polarizing spectacle lenses having different polarization axes; and, FIG. 4D shows the polarizing spectacles comprising vertically polarizing spectacle lenses;

FIGS. 7A and 7B show a selection of motifs for images for carrying out the method according to FIG. 5:

FIG. 7A shows a road traffic motif:
top image: recording with polarization filter having a horizontal polarization axis; and,
bottom image: recording with polarization filter having a vertical polarization axis;

FIG. 7B shows a beach motif:
top image: recording with polarization filter having a horizontal polarization axis; and,
bottom image: recording with polarization filter having a vertical polarization axis;

FIGS. 8A to 8E show a defect identification on the basis of a simple image pattern:

FIG. 8A shows the two polarizing images and superposed image;

FIG. 8B shows the visible image when viewing the superposed image according to FIG. 8A with a polarizing spectacle lens having a vertical polarization axis;

FIG. 8C shows the visible image when viewing the superposed image according to FIG. 8A with a polarizing spectacle lens having a polarization axis inclined by 45°;

FIG. 8D shows the visible image when viewing the superposed image according to FIG. 8A with a polarizing spectacle lens having a horizontal polarization axis; and, FIG. 8E shows the visible image when viewing the superposed image according to FIG. 8A with a polarizing spectacle lens having a nonuniform polarization axis;

Figure 1C:
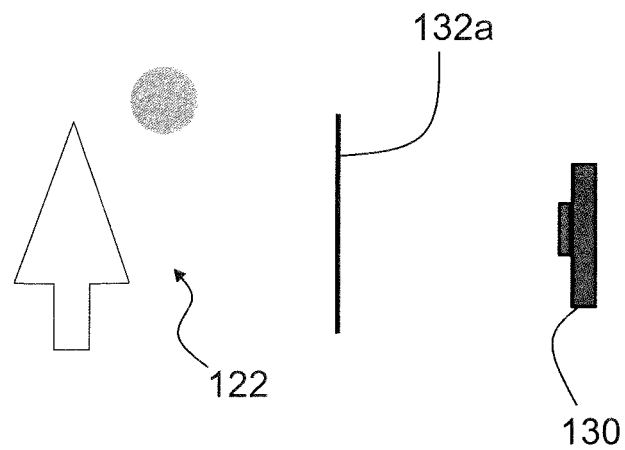
FIG. 1C shows an example of how an image is recorded with a polarization filter.

DESCRIPTION OF THE PREFERRED
EMBODIMENTS OF THE INVENTION

FIG. 1A shows the schematic structure of an apparatus 100 according to the invention for testing the two polarizing spectacle lenses (410a, 410b) of spectacles 400. The apparatus 100 comprises an image generating device 102. The image generating device 102 contains a display device in the form of a display 110 having a multiplicity of pixels (112a, 112b, 112c) which are driven by a driver group 120 and a computer unit 150 with memory 152. Furthermore, a light source 140 for activating phototropic spectacle lenses (410a, 410b) is provided in the embodiment according to FIGS. 1A and 1B.

The schematic in FIGS. 1A and 1B furthermore shows a subject 170 who views the display 110 of the image generating device 102 from a distance D. The distance D is in the range of 30 cm<D<7 m. The subject 170 is wearing spectacles 400 comprising two polarizing spectacle lenses (410a, 410b) on the subject's nose 160. Accordingly, polarizing spectacle lenses (410a, 410b) in a frame 402 are situated in front of the eyes 161a and 161b of the subject 170.

The display 110 is embodied for example as a light-emitting diode matrix display (designated hereinafter as LED matrix display) or as a liquid crystal matrix display (designated hereinafter as LC matrix display).

Each pixel (112a, 112b, 112c) of the display 110 has a uniquely defined polarization plane. There are various possibilities for defining the polarization plane of each pixel (112a, 112b, 112c).

In this regard, the respective polarization planes of the pixels (112a, 112b, 112c) can be predefined for example in terms of hardware, that is, for example, by means of corresponding polarization films. In this case, groups of pixels (112a, 112c) advantageously have the same defined polarization plane. In this case, the intensities of each individual one of the pixels (112a, 112b, 112c) are set by means of the driver group 120 and the computer unit 150.

The definition of the polarization plane of pixels can alternatively also be predefined by the driver group 120 and the computer unit 150. This is possible for example in the case of so-called dual stack LC displays. The intensities and the polarization plane of each individual one of the pixels (112a, 112b, 112c) are then set by means of the driver group 120 and the computer unit 150.

There are displays in which there is only a choice between discrete, fixedly predefined polarization planes. In other displays, the polarization plane of the pixels (112a, 112b, 112c) can be altered in an angular range of between 0° and 90°.

Two images (114, 116) having the same motif 122 are stored in the memory 152. A polarization direction is stored with regard to each image (114, 116), wherein the polarization direction of one image 114 deviates from the polarization direction of the other image 116. Storing a polarization direction is understood to mean storing retrievable information for displaying the images (114, 116) with linearly polarized light having a predefined polarization direction. This includes the case where the respective images (114, 116) are outputted via the pixels of a display which are equipped with a filter whose polarization axis corresponds to the assigned polarization direction.

With the aid of the display 110 according to the invention, the two images (114, 116) are displayed simultaneously in a manner superposed on one another as displayed image 118, specifically in such a way that the motif 122a of the first image 114 and the motif 122b of the second image 116 coincide dimensionally identically in a manner forming the motif 122, as is shown schematically in a simplified manner in FIG. 1B.

Figure 1D:
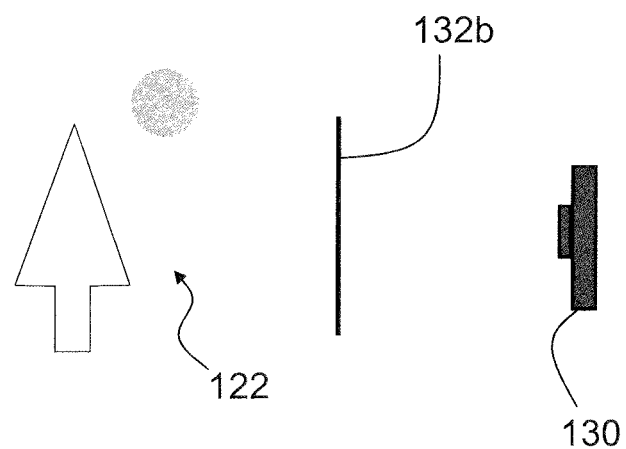
FIG. 1D shows an example of how an image is recorded with another polarization filter.

FIG. 1C shows a motif 122 which is to be imaged by the camera 130. A polarization filter 132a is arranged ahead of the lens of the camera 130. The polarization filter 132a has a first polarization axis and can, for example, be a vertical polarization filter. The first image 114 in FIG. 1D is a photographic image captured by camera 130 with the polarization filter 132a arranged ahead of the camera. The motif 122 captured with the first image includes a pine tree and the sun. The second image 116 is also a photographic image take by a camera 130 with a polarization filter 132b arranged ahead of the camera. The polarization filter 132b has a second polarization axis and can, for example, be a horizontal polarization filter. The motif 122 of the second image 116 likewise includes the pine tree and the sun.

One possible arrangement of the pixels for displaying the first image 210 and of the pixels for displaying the second image 220 is shown in FIG. 2. The first image 210 consists of the pixels (210a, 210b, 210c, 210d, 210e) having a first defined polarization plane. This defined polarization plane can occupy, for example, 90° with respect to the horizontal, that is, have a vertical orientation. It is likewise possible for the defined polarization plane to occupy, for example, 45° with respect to the horizontal. The second image 220 consists of the pixels (220a, 220b, 220c, 220d, 220e) having a second defined polarization plane. The first and second defined polarization planes can form an angle of 90°. It is possible for the second defined polarization plane to occupy, for example, 0° with respect to the horizontal, that is, to have a horizontal orientation. It is likewise possible for the second polarization plane to occupy, for example, 135° with respect to the horizontal.

FIG. 2 additionally shows one example of a superposed polarized image 230 consisting both of the image 210 having pixels (210a, 210b, 210c, 210d, 210e) having a first defined polarization plane and of the image 220 having pixels (220a, 220b, 220c, 220d, 220e) having a second defined polarization plane.

FIG. 3 shows a second variant for the arrangement of polarizing pixels. The first image 310 consists of the pixels (310a, 310b, 310c, 310d, 310e, 310f, 310g, 310h, 310i, 310k) having a first defined polarization direction and intensity. This defined polarization direction is vertical in the embodiment. The second image 320 consists of the pixels (320a, 320b, 320c, 320d, 320e, 320f, 320g, 320h, 320i, 320k) having a second defined polarization direction and intensity. The first and second defined polarization directions form an angle of 90°. Different orientations are possible in both cases.

The superposition of the two images 310 and 320 to form the displayed image 330 is carried out pixel by pixel by vector addition of the electric field vector, which takes account of intensity (magnitude) and polarization direction of the light emerging from the respective pixels (330a, 330b, 330c, 330d, 330e, 330f, 330g, 330h, 330i, 330k).

Figure 4A:
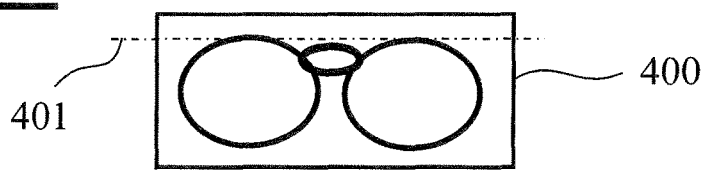
FIGS. 4A to 4D show a basic structure of polarizing spectacle lenses in a spectacle frame.
Figure 4B:
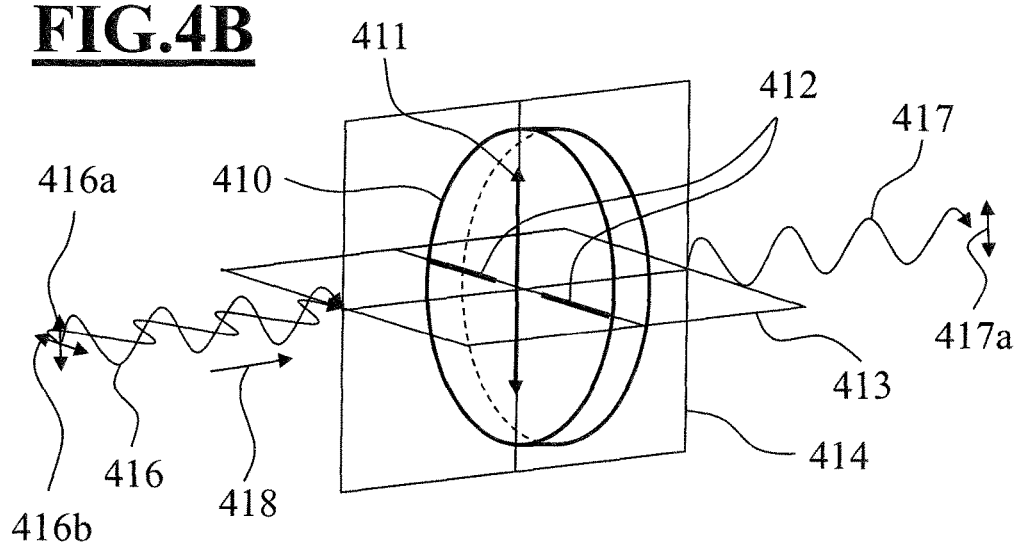
Figure 4C:
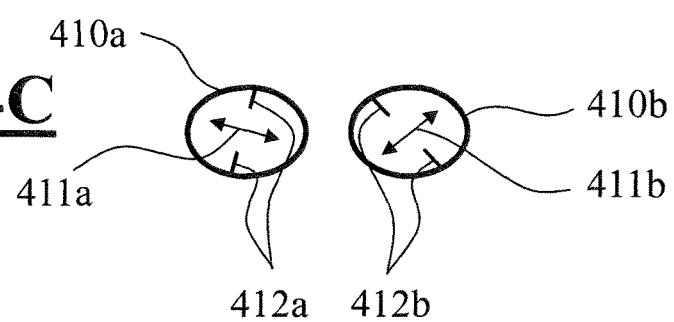

FIGS. 4A to 4D show the structure of polarizing spectacle lenses 410. Polarizing spectacle lenses (410, 410a, 410b) are incorporated into a frame 402 (FIG. 4A) having a frame horizontal 401 (FIGS. 4B, 4C). If unpolarized light 416 impinges on a polarizing spectacle lens 410, as is shown in FIG. 4B, then only a part 417 is transmitted, specifically (apart from reflection and absorption losses) that part of the electromagnetic radiation of the impinging light 416 whose polarization direction 416a coincides with the polarization axis 411 of the spectacle lens 410. The polarization direction of the transmitted light 417 is identified by the reference sign 417a in the drawing. That part of the electromagnetic radiation of the impinging light 416 whose polarization direction 416b does not coincide with the polarization axis 411 of the spectacle lens 410 is either reflected or absorbed.

Furthermore, the transmission plane 414 and the polarization plane 413 are depicted in FIG. 4B. The transmission plane 414 of the polarizing spectacle lens 410 is a plane which intersects the spectacle lens 410 and contains the direction 418 of propagation of the transmitted radiation 417 and is parallel to the orientation 416a of the maximum transmission of the electrical vector of the transmitted radiation. The transmission plane 414 can therefore include the polarization axis 411. The normal plane to the transmission plane 414 is called the polarization plane 413 and is identified by markings 412 on the spectacle lens 410.

Figure 4D:
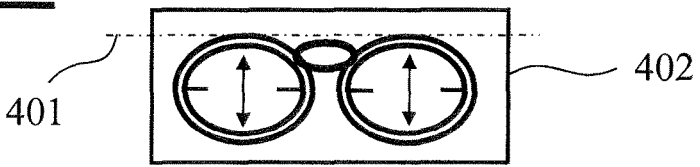

Polarizing spectacle lenses (410, 410a, 410b) are therefore characterized in that they have a defined polarization axis (411, 411a, 411b), as is also clarified graphically once again in FIG. 4C. The position of the polarization axes (411a, 411b) and of the polarization planes optionally identified by the markings (412a, 412b) relative to the frame horizontal 401 is defined as a result of the incorporation of polarizing spectacle lenses (410a, 410b) into a frame 402. FIG. 4D shows spectacle lenses in a frame 420 having defined polarization axes (411a, 411b) of in each case 90° (vertical orientation). The polarization planes optionally identified by the markings (412a, 412b) are oriented horizontally in the coordinate system of the frame, that is, parallel to the frame horizontal 401. This orientation is desired in the case of sunglasses, for instance, in order to minimize reflections from horizontal surfaces.

Figure 5:
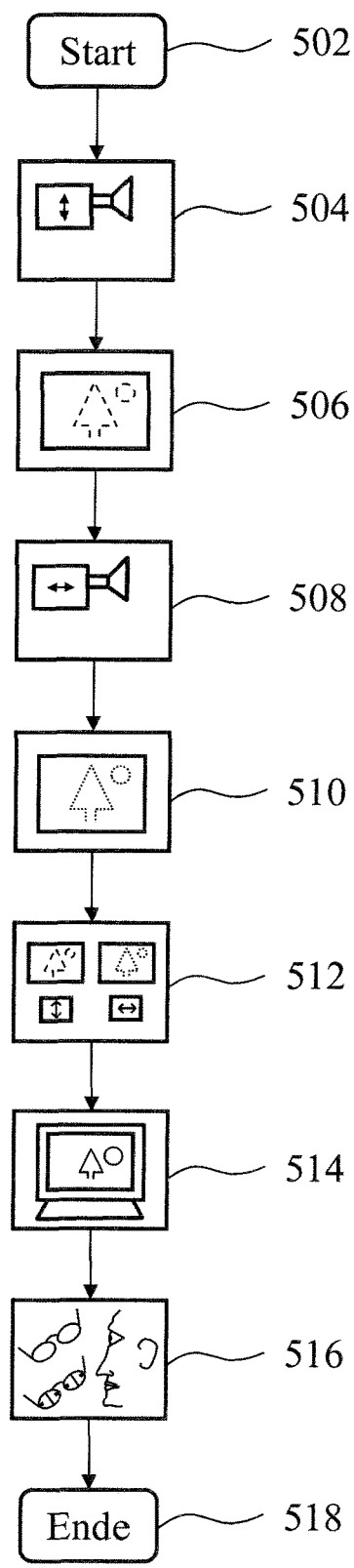
FIG. 5 shows a schematic flow diagram of a method according to the invention for demonstrating the visual impression for a wearer of spectacles comprising polarizing spectacle lenses.

FIG. 5 shows a method for demonstrating the visual impression for a wearer of spectacles comprising polarizing spectacle lenses in schematic illustration:

The starting point is firstly the search for a suitable motif on the basis of which the effect of polarizing spectacles is intended to be clarified for the wearer (not illustrated in FIG. 5, 502). FIG. 7 shows a selection of motifs for images that are considered to be particularly suitable by the inventor because they allow simulation of a visual impression under natural ambient conditions. The illustration shows in each case on the left an image of an object or a landscape in a way that the object or the landscape is perceived by the direct observer with the naked eye, and on the right an image of the object or the landscape in a way that the observer sees the object or the landscape when wearing polarizing spectacles as intended.

In a first step 504, a motif found to be suitable is captured in a photographic recording by a camera with, disposed in front, a polarization filter having a first polarization axis. The polarization axis runs in the vertical direction in the example illustrated. Storing the image from the camera is shown in step 506. In a further step 508, the same camera is used to capture a photographic recording of the motif with a polarizing filter disposed in front, but with a second polarization axis, which deviates from the first polarization axis. The second polarization axis runs in the horizontal direction in the example illustrated. Storing the second image from the camera is shown in step 508.

A subsequent step 512 involves providing the first image together with the associated first polarization direction and the second image together with the associated second polarization direction. Step 514 involves displaying the first image with light polarized in the first polarization direction and the second image with light polarized in the second polarization direction in a superposed representation, such that the motif of the first image and the motif of the second image coincide dimensionally identically.

In the subsequent step 516, the displayed superposed image is shown for viewing to a subject 170, a potential wearer of polarizing spectacles. The wearer 170 is positioned such that the wearer can view the displayed images in a superposed representation optionally with the naked eye (161a, 161b) and/or through spectacles comprising non-polarizing spectacle lenses and/or through the spectacles 400 comprising the polarizing spectacle lenses (410a, 410b).

Figure 6:
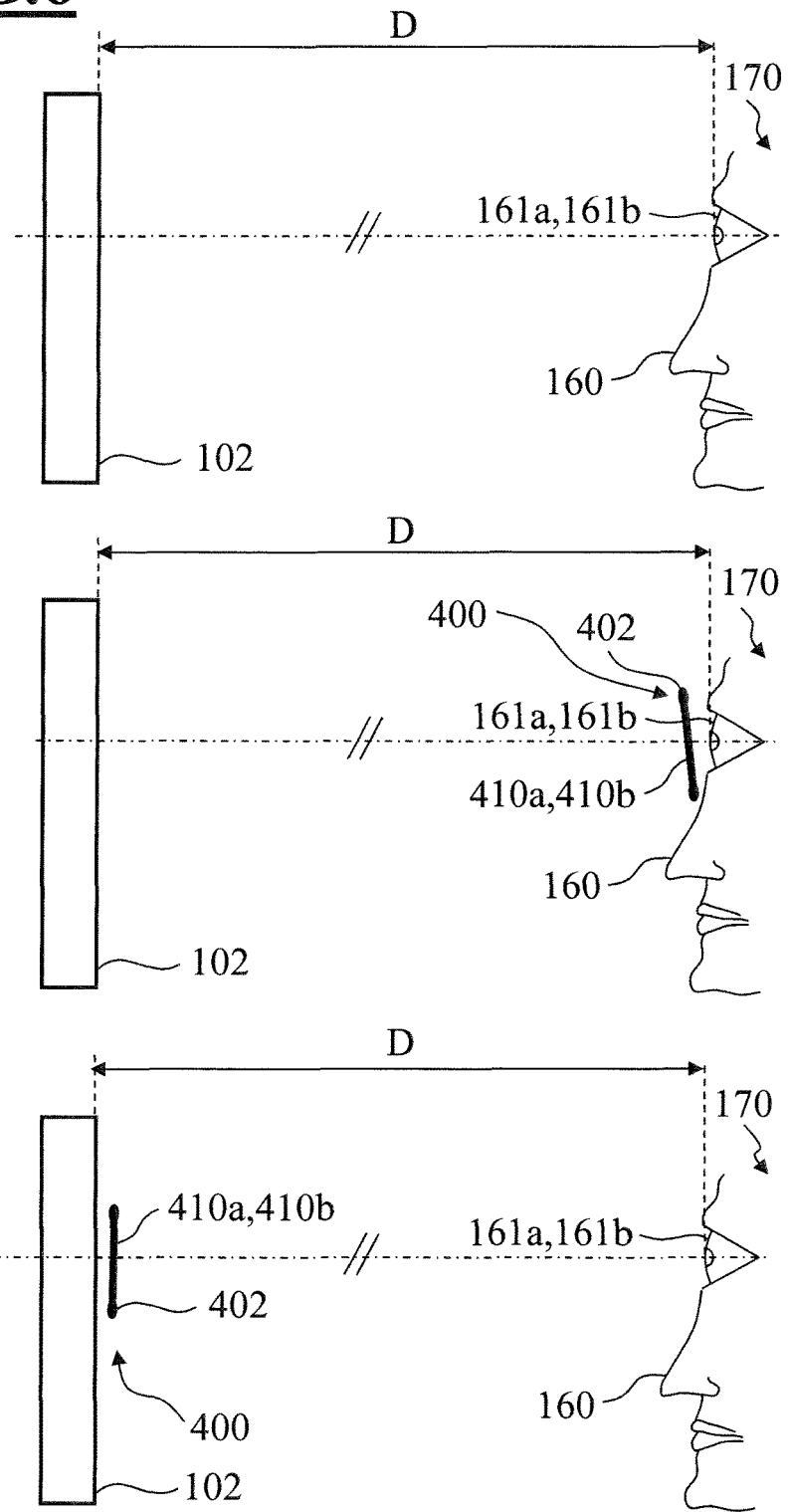
FIG. 6 shows a schematic of the assessment of the quality of polarizing spectacle lenses with an apparatus according to FIGS. 1A and 1B.

FIG. 6 shows this process in schematic illustration. FIG. 6 reveals the image generating device 102 from FIGS. 1A and 1B, which is observed by the subject 170 at the distance D, wherein no polarizing element whatsoever, such as polarizing spectacle lenses in a frame, for example, is positioned between the eyes (161a, 161b) of the subject 170 and the image generating device 102. A superposition of the images is perceived.

In the case of different defined first and second polarization planes of pixels (112a, 112b, 112c, . . . ), no intensity difference—dependent on the polarization axis—between the first polarized image and the second polarized image is perceived without a polarizing element, such as polarizing spectacle lenses, for example, in the beam path.

If polarizing spectacle lenses in a frame are situated between the eyes (161a, 161b) of the subject 170 and the image generating device 102, then a difference in the intensities of the images is perceived in the case of different defined first and second polarization planes of images. This difference in the intensities can be used for comparison between different polarizing spectacle lenses in a frame. In particular, it is possible to investigate whether spectacle lenses in the frame have polarizing properties.

FIG. 4B shows the case where the spectacles 400 comprising the polarizing spectacle lenses (410a, 410b) in the frame 402 are positioned in local proximity to the subject 170. Local proximity to the subject 170 should be understood to mean that the distance between the subject 170 and the polarizing spectacle lenses (410a, 410b) is less than 30% of the distance D. In particular, the polarizing spectacle lenses (410a, 410b) in the frame 402 can be worn by the subject 170 on the nose 160 in a manner as intended.

FIG. 4C shows the case where the polarizing spectacles 400 are positioned in local proximity to the image generating device 102. In local proximity should be understood to mean that the distance between the image generating device 102 and the polarizing spectacle lenses in a frame 420 is less than 30% of the distance D. In particular, the polarizing spectacles 400 can be positioned at a distance of 0 cm to 10 cm relative to the image generating device 102.

FIG. 8A shows a first polarized image 210 and a second polarized image 220, and also the superposed polarized image 230 that arises. The first and second polarized images (210, 220) differ in the optical properties. In this embodiment, the first polarized image 210 consists of pixels (for example, corresponding to the pixels (210a, 210b, 210c, . . . ) according to FIG. 2) having a first defined polarization plane, wherein the polarization plane is vertical. The second polarized image 220 consists of pixels (for example, 220a, 220b, 220c, . . . ) having a second defined polarization plane, wherein the polarization plane is horizontal. The first image 210 is maintained in a first color over the whole area, and the second image 220 is maintained in a second color over the whole area. In this example, the color green is chosen as the first color, and the color red is chosen as the second color.

If no polarizing element whatsoever, such as polarizing spectacle lenses (410a, 410b) in a frame 402, for example, is positioned between the eyes (161a, 161b) of the subject 170 and the image generating device 102, then the superposed polarized image 230 is perceived.

The superposed polarized image 230 appears as yellow in this first embodiment.

If polarizing spectacle lenses (410a, 410b) are situated between the eyes (161a, 161b) of the subject 170 and the display 110, which spectacle lenses, as desired in the case of sunglasses, for both polarizing spectacle lenses (410a, 410b) have a defined polarization axis (411a, 411b) of in each case 90° or in each case have a horizontally oriented polarization plane parallel to a frame horizontal 401, which can be identified by markings (412, 412a, 412b), then in the case of a high degree of polarization P only the first image 210 is displayed since the polarization plane of the pixels (210a, 210b, 210c) of the first image 210 with the polarization axis 411a of the polarized spectacle lenses (410a, 410b) are approximately parallel for this case. The transmission plane 414 thus corresponds to the polarization plane of the pixels (210a, 210b, 210c) of the first image 210. The polarization plane of the pixels (220a, 220b, 220c) of the second image 220 forms an angle of 90° with the polarization axis (411a, 411b) of the polarized spectacle lenses (410a, 410b) or corresponds to the polarization plane, such that the second image 220 is perceived only with very low intensity.

In this first embodiment, it is unimportant whether the polarizing spectacle lenses (410a, 410b) in the frame 402 are positioned in local proximity to the subject 170, as shown in FIG. 6, or are positioned in local proximity to the image generating device 102 as in FIG. 6.

In a further embodiment, not illustrated graphically, two dimensionally identical images with an intensity distribution B1(x,y) and B2(x,y) are generated in a computer. In this case, x and y are the index of the column and line, respectively, on the display, and the function value B1 and B2 at such a point x,y indicates the brightness of a pixel or, in the case of colored representation, the brightness of the respective color red, green, and blue. The image B1 differs from image B2 only in the optical properties. In particular, the image B1 exhibits reduced reflections, reduced glare or the like. Mathematically it holds true for every point x,y that B2(x,y)>=B1(x,y).

If a first polarized image 210 is then represented by the intensity distribution B1(x,y), and a second polarized image 220 by the intensity distribution B2(x,y)−B1(x,y), the superposed polarized image 230 that arises results in an intensity distribution B2(x,y).

If no polarizing element whatsoever, such as polarizing spectacle lenses 410a, 410b in a frame 402, for example, is positioned between the eyes (161a, 161b) of the subject 170 and the image generating device 102, then the superposed polarized image 230, that is, the intensity distribution B2(x, y), is perceived.

If polarizing spectacle lenses (410a, 410b) are situated between the eyes (161a, 161b) of the subject 170 and the display 110, which spectacle lenses, as desired in the case of sunglasses, for both polarizing spectacle lenses (410a, 410b) have a defined polarization axis (411a, 411b) of in each case 90° or in each case have a horizontally oriented polarization plane parallel to a frame horizontal 401, which can be identified by markings (412, 412a, 412b), then in the case of a high degree of polarization P only the first image 210, that is, the intensity distribution B1(x,y), is displayed since the polarization plane of the pixels (210a, 210b, 210c) of the first image 210 is approximately parallel to the polarization axis 411a of the polarized spectacle lenses (410a, 410b) for this case. The transmission plane 414 thus corresponds to the polarization plane of the pixels (210a, 210b, 210c) of the first image 210. The polarization plane of the pixels (220a, 220b, 220c) of the second image 220 forms an angle of 90° with the polarization axis (410a, 410b) of the polarized spectacle lenses (410a, 410b) or corresponds to the polarization plane, such that the second image 220 is perceived only with very low intensity.

In the case of polarizing spectacle lenses (410a, 410b) in a frame 402 with a polarization axis (411a, 411b) which is defined for both polarizing spectacle lenses (410a, 410b) and which differs from 90°, or in the case of a low degree of polarization P or in the case of other deficiencies in respect of quality, such as, for instance, a nonuniform profile of the degree of polarization over the surface of the spectacle lenses (410a, 410b), the wearer 170 of spectacles sees a superposition of the first and second images (210, 220), as is shown in FIG. 8C. A direct comparison between different qualities of polarizing spectacle lenses (410a, 410b) thus becomes possible.

In the case of a polarization axis (411a, 411b) of the polarizing spectacle lenses (410a, 410b) that deviates completely from 90° or a polarization plane that deviates completely from the frame horizontal 401, it is possible for the second image 220 to be perceived with higher intensity than the first image 210. This case is shown in FIG. 8D.

FIG. 8E shows one example of a realistic case of the visual impression with polarizing spectacle lenses (410a, 410b) of low quality, as is known from many experiments. The visual impression through the polarizing spectacle lens 410 having a polarization axis 411a is shown in this case. In the center of the polarizing spectacle lens 410, the first polarizing image pattern 210 is still predominantly displayed. In the present example, only the color green can be seen in the center. A superposition of the first and second images (210, 220) can already be seen at the edge of the polarizing spectacle lens 410. The color impression is already yellow. Inhomogeneities of the polarizing spectacle lens 410 can additionally be determined, which become visible in the form of zones having a low degree of polarization (800a, 800b, 800c, 800d).

Accordingly, the present invention makes it possible to visualize various defects on polarizing spectacle lenses (410a, 410b).

Figure 9:
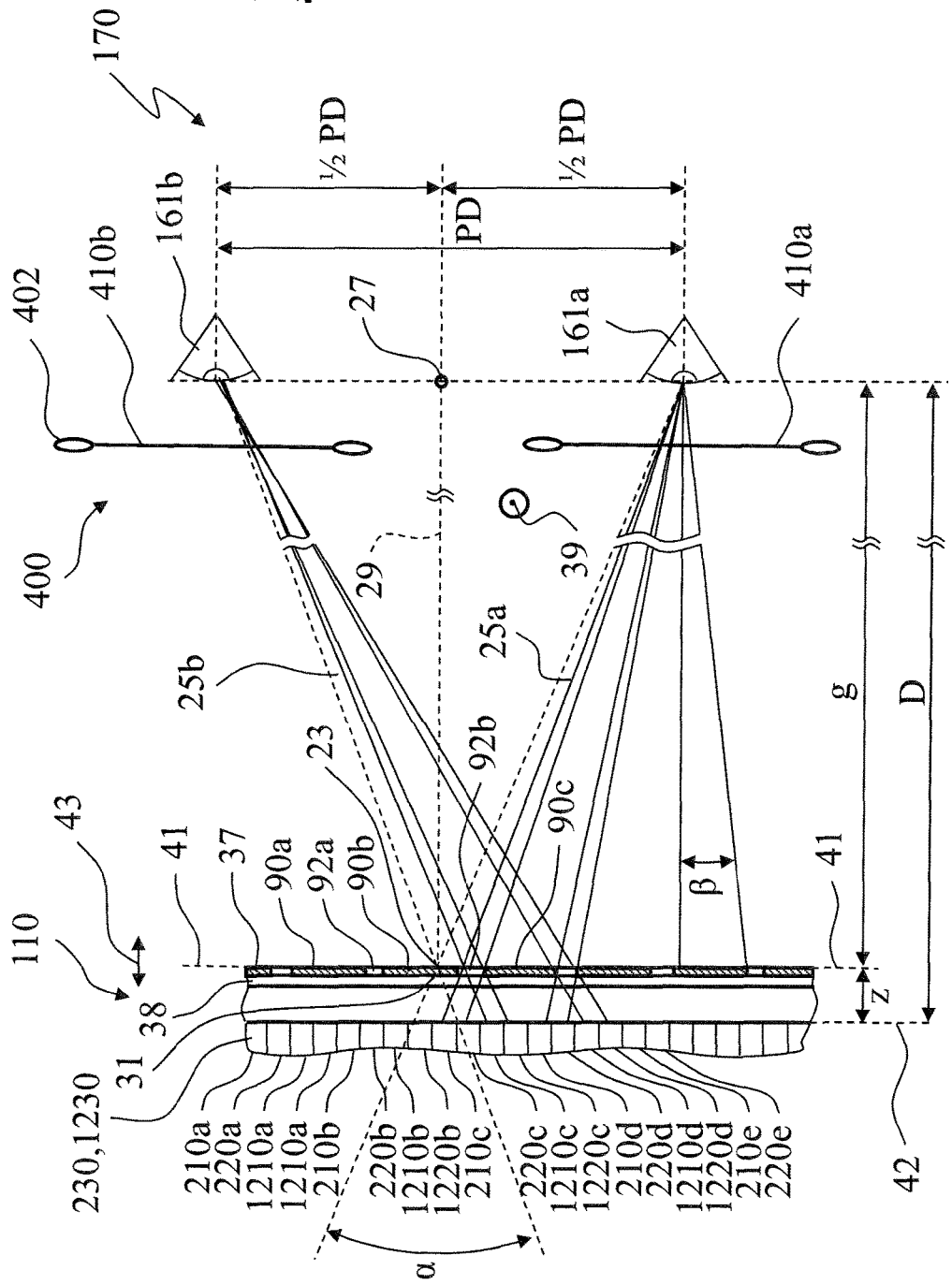
FIG. 9 shows a variant for the arrangement of polarizing pixels and a parallax mask in the display of the apparatus according to FIGS. 1A and 1B for generating a three-dimensional visual impression.
Figure 10:
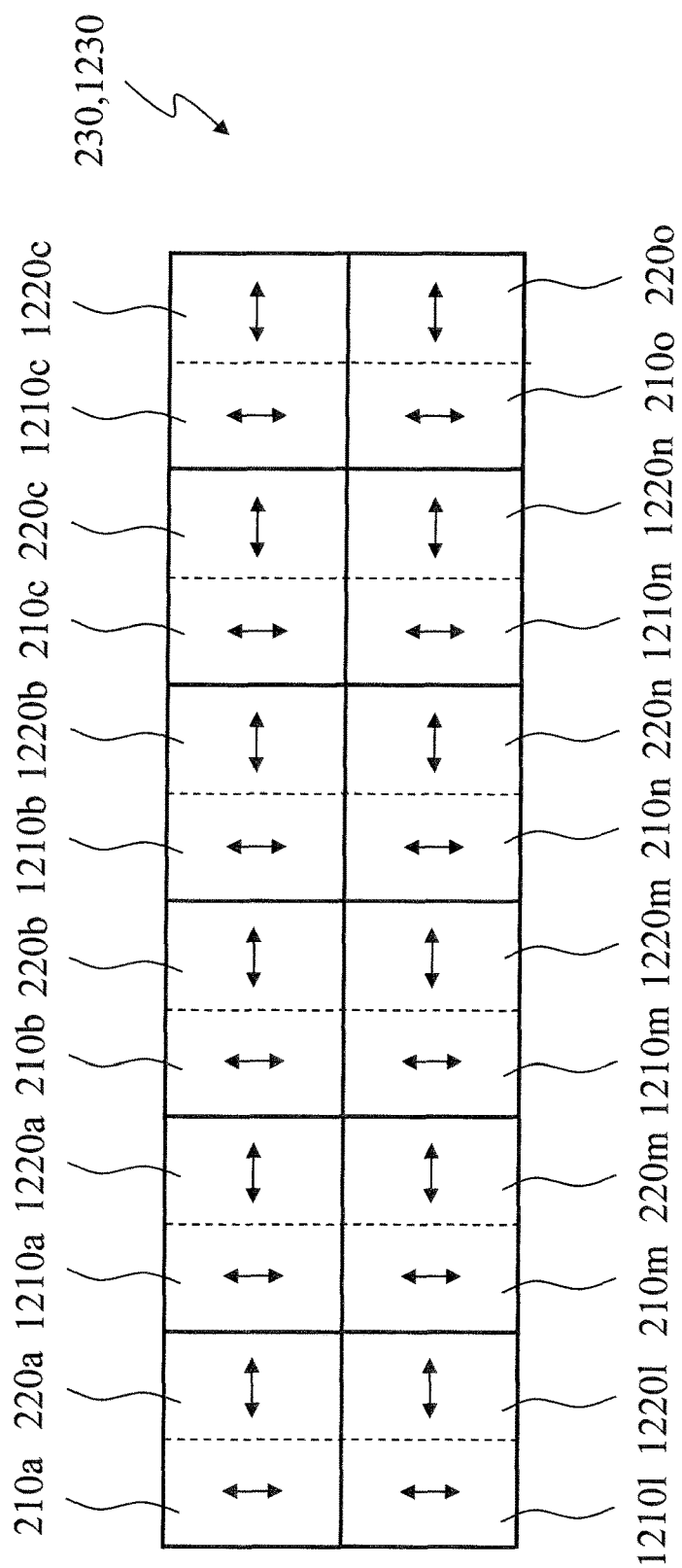
FIG. 10 shows the arrangement of polarizing pixels in the display of the apparatus of the embodiment according to FIG. 9; and, FIG. 11 shows the arrangement of transmissive and non-transmissive regions in the parallax mask of the embodiment according to FIG. 9.

FIG. 9 in conjunction with FIGS. 10 and 11 shows an apparatus 100 which can be used to generate a three-dimensional visual impression for an observer 170. FIG. 9 is a partial section of the arrangement shown in FIGS. 1A and 1B comprising the apparatus 100 according to the invention and the subject 170 along the line I-I in FIG. 1A.

The display 110 shown in FIG. 9 comprises an arrangement 1230 of a multiplicity of pixels (210a, 210b, 210c, . . . 1210a, 1210b, 1210c, . . . , 220a, 220b, 220c, . . . 1220a, 1220b, 1220c, . . . ) which are arranged like a checkerboard pattern, as shown in an excerpt in plan view in FIG. 10. The pixels (210a, 210b, 210c, 210d, 210m, 210n, . . . ) and (220a, 220b, 220c, 220d, 220m, 220n, . . . ) are provided for exclusive viewing by the left eye 161a, and the pixels (1210a, 1210b, 1210c, 1210d, 1210m, 1210n, . . . ) and (1220a, 1220b, 1220c, 1220d, 1220m, 1220n, . . . ) are provided for exclusive viewing by the right eye 161b. Light (25a, 25b) which emerges from the display 110 through the pixels (210a, 210b, 210c, . . . 1210a, 1210b, 1210c) in the direction of the observer 170 has a linear polarization having a vertical polarization direction. Light (25a, 25b) which emerges from the display 110 through the pixels (220a, 220b, 220c, . . . 1220a, 1220b, 1220c, . . . ) in the direction of the observer 170 has a linear polarization having a horizontal polarization direction.

A superposed image (230, 1230) having horizontally and vertically polarized pixels (210a, 210b, 210c, . . . 1210a, 1210b, 1210c, . . . , 220a, 220b, 220c, . . . 1220a, 1220b, 1220c, . . . ) thus results for each eye (161a, 161b), as has already been described in detail above with regard to FIG. 2.

In the present embodiment, the display 110 is equipped with a parallax mask 37, which forms a diaphragm system. The mask 37 of the diaphragm system 36 is arranged on a transparent carrier element 38. FIG. 11 shows a portion of the mask 37 for the diaphragm system in plan view.

The mask 37 has regions (90a, 90b, 90c, . . . ) which are arranged offset with respect to one another and which are nontransmissive to the light (25a, 25b) of the pixels (210a, 210b, 210c, . . . 1210a, 1210b, 1210c, . . . , 220a, 220b, 220c, . . . 1220a, 1220b, 1220c, . . . ) of the display 110. The regions (92a, 92b, 92c, . . . ) of the mask 37 are complementary to the regions (90a, 90b, 90c, . . . ). The regions (92a, 92b, 92c, . . . ) are transmissive to the light (25a, 25b) of the display 110.

The regions (90a, 90b, 90c, . . . ), on the one hand, and the regions (92a, 92b, 92c, . . . , 94b, 94c, . . . ), on the other hand, have a rectangular shape in each case in a manner similar to the pixels (210a, 210b, 210c, . . . 1210a, 1210b, 1210c, . . . , 220a, 220b, 220c, . . . 1220a, 1220b, 1220c, . . . ) The regions (90a, 90b, 90c, . . . ) and (92a, 92b, 92c) are arranged in successive lines 94. In lines (94a, 94b; 94b, 94c) adjacent to one another, the regions (92a, 92b, 92c, . . . ) that are transmissive to the light are positioned in a manner offset with respect to the regions (90a, 90b, 90c, . . . ) that are nontransmissive to the light (25a, 25b). The width $B_{Mu}$ of the regions (92a, 92b, 92c, . . . ) that are nontransmissive to the light (25a, 25b) is greater than the width $B_{Md}$ of the regions that are transmissive to the light (25a, 25b). The following preferably holds true here:

$$B_{Md} = \tfrac{1}{2} B_{Mu} \tag{1}$$

With the rectangular regions (90a, 90b, 90c; 92a, 92b, 92c) that are transmissive and nontransmissive to the light of the display 110, the mask 37 separates the light (25a, 25b) for the left and right eyes (161a, 161b) of the subject 170 in the light passage plane 41. The light passage plane 41 of the mask 37 is freely displaceable in the display 110. For this purpose, the display 110 contains an adjusting device (not illustrated) for the diaphragm system. The adjusting device can be used to move the diaphragm system in the horizontal direction in accordance with the double-headed arrow 43 shown in FIG. 9 and in the horizontal direction perpendicular to the direction of the double-headed arrow 43. For the adjustment, the adjusting device contains a piezoelectric drive, which can be controlled by the display 110 via a driver assembly by means of the computer 150 depending on an angular position α of the eyes (161a, 161b) of the subject 170, the angular position being detected by means of a camera (not illustrated). The adjusting device makes it possible to vary the distance (z) between the plane 42 of the display 110 and the light passage plane 41 of the diaphragm 37 in the range of 8 mm ≤ z ≤ 15 mm. In accordance with the center 27 of the pupillary distance PD, the center being detected by means of the computer 150 and the camera (not illustrated), the diaphragm system is set and tracked by means of the adjusting device such that the straight line 29 through the points 27 and the vertical line 31 behind the diaphragm 37 on the plane 42 of the display 110 meets the boundary of two adjacent display zones (210a/220a, 1210a/1220a, 210b/1210b . . . ) In this case, the position of the display zones (210a/220a, 210b/1210b . . . ) and the display zones (1210a/1220a, 1210b/1220b, . . . ) of the display 110 is adapted to the displacement of the mask 37. For the adjustment of the diaphragm system, the computer 150 determines, from the angle γ at which the camera detects the center 27 of the pupillary distance PD in relation to the surface normal 29 at the center 31 of the mask 37, an expedient horizontal displacement V of the mask 37 parallel to the direction 39, that is, perpendicular to the plane of the drawing and parallel to the light passage plane 41, where $$V := z \tan \gamma. \tag{2}$$

The expedient displacement of the mask 37 therefore satisfies the following relationship:

$$V/z = S/g \tag{3}$$

In this case, S is the deviation of the center of the perpendicular projection of the pupillary distance PD in the plane 41 of the mask 37 from the surface normal 29 on the vertical line 29. (g) is the distance between the subject 170 and the light passage plane 41 of the diaphragm system.

It is understood that the foregoing description is that of the preferred embodiments of the invention and that various changes and modifications may be made thereto without departing from the spirit and scope of the invention as defined in the appended claims.

LIST OF REFERENCE SIGNS

α visual angle
β angle
B1 intensity distribution
B2 intensity distribution
D distance between the subject and the display
$B_{Md}$ width of the transmissive regions of the mask
$B_{Mu}$ width of the light-nontransmissive regions of the mask
g distance between the subject and the light passage plane
γ angle
PD pupillary distance
S deviation
V displacement
x direction, index
y direction, index
z direction, distance
25a light for the right eye
25b light for the left eye
27 center
29 straight line/surface normal
31 point
37 mask
36 diaphragm system
38 carrier element
39 direction
41 light passage plane
42 plane
43 double-headed arrow
90a nontransmissive region
90b nontransmissive region
90c nontransmissive region
. . .
92a transmissive region
92b transmissive region
92c transmissive region
. . .
100 apparatus
102 image generating device
110 display
112a pixel
112b pixel
112c pixel
114 first image
116 second image
118 displayed image
120 driver group
122a motif of the first image
122b motif of the second image
122 motif
130 Camera
132 polarization filter
132a vertical polarization filter
132b horizontal polarization filter
140 light source for activating phototropic spectacle lenses
150 computer unit, computer
152 memory
160 nose
161a right eye
161b left eye
170 subject
210 first polarized image
210a pixel having a first defined polarization plane
210b pixel having a first defined polarization plane
210c pixel having a first defined polarization plane
. . .
220 second polarized image
220a image having a second defined polarization plane
220b image having a second defined polarization plane
220c image having a second defined polarization plane
. . .
230 superposed polarized image
310 first polarized image
310a pixel having a first defined polarization axis
310b pixel having a first defined polarization axis
310c pixel having a first defined polarization axis
. . .
320 second polarized image
320a pixel having a second defined polarization axis
320b pixel having a second defined polarization axis
320c pixel having a second defined polarization axis
. . .
330 superposed polarized image
330a pixel having polarization axis determined by vector addition
330b pixel having polarization axis determined by vector addition
330c pixel having polarization axis determined by vector addition
. . .
400 spectacles
401 frame horizontal
402 frame
404 frame horizontal
410 polarizing spectacle lens
410a polarizing spectacle lens for the right eye
410b polarizing spectacle lens for the left eye
411 polarization axis
411a polarization axis
411b polarization axis
412 markings
412a markings
412b markings
413 polarization plane
414 transmission plane
416 light impinging on spectacle lens
416a polarization direction
416b polarization direction
417 light being transmitted by spectacle lens
417a polarization direction
418 direction of propagation
420 polarizing spectacle lenses in a frame
502 method step
504 method step
506 method step
508 method step
510 method step
512 method step
514 method step
516 method step
518 method step
800a zone having low degree of polarization
800b zone having low degree of polarization
800c zone having low degree of polarization
800d zone having low degree of polarization 1210 first polarized image for the right eye
1210a pixel having a first defined polarization axis
1210b pixel having a first defined polarization axis
1210c pixel having a first defined polarization axis
. . .
1220 second polarized image for the left eye
1220a pixel having a second defined polarization axis
1220b pixel having a second defined polarization axis
1220c pixel having a second defined polarization axis
. . .
1230 superposed polarized image

What is claimed is:

1. An apparatus for demonstrating visual impressions for a wearer of spectacles having polarizing spectacle lenses, the apparatus comprising:
   a memory for making available a first image having a motif and a first polarization direction corresponding thereto;
   a memory for making available a second image having said motif and a second polarization direction corresponding thereto and different from said first polarization direction;
   a display unit;
   computer program code stored on a non-transitory computer readable medium which, when executed by a processor, controls said display unit and causes said first image with light polarized in said first polarization direction and said second image with light polarized in said second polarization direction to he displayed on said display unit in overlapping presentation so as to cause said motif of said first image and said motif of said second image to mutually coincide identically as to shape as displayed on said display unit; and,
   said program code, when executed by a processor, further causing said display unit to display said first image and said second image such that an observer perceives said first image and said second image simultaneously.

2. The apparatus of claim 1, wherein said first image is a photographic recording of a camera having a first polarization filter arranged ahead thereof configured to polarize light in said first polarization direction and defining said first polarization direction; and, said second image is a photographic recording of a camera having a second polarization filter arranged ahead thereof and defining said second polarization direction different from said first polarization axis.

3. The apparatus of claim 1, wherein said first image is a photographic recording of a camera having a first polarization filter arranged ahead thereof and defining said first polarization direction.

4. The apparatus of claim 1, wherein said second image is a photographic recording of a camera having a polarization filter arranged ahead thereof and defining said second polarization direction.

5. The apparatus of claim 1, wherein said first image and said second image differ in at least one optical characteristic.

6. The apparatus of claim 5, wherein said optical characteristic is selected from the group including contrast, brightness, saturation and hue.

7. The apparatus of claim 1, wherein said first image displayed is comprised of first image points arranged in the manner of fields of a single one of the colors of a chess board pattern and said second image displayed is comprised of second image points arranged in the manner of fields of another color of the chess board pattern.

8. The apparatus of claim 1, wherein said first image is comprised of image points arranged in the manner of the fields of a chess board pattern and said second image is comprised of same image points; each of the image points displayed contains the information of corresponding image points of the first image and the information of corresponding image points of the second image; and, wherein a polarization direction corresponds to a vector addition of polarization direction vectors of the corresponding image points of the first image and of the second image which polarization direction vectors consider the intensity.

9. The apparatus of claim 1, wherein:
   a first light is supplied from a first group of predetermined regions of the display unit to an optical beam path;
   a second light is supplied to the beam path from a second group of predetermined regions of the display unit; and,
   said apparatus further comprises an optic component group for separating said first light from said second light in order to transmit said first light to the left eye of the wearer and said second light to the right eye of the wearer.

10. The apparatus of claim 1, further comprising a light source for activating phototropic spectacle lenses.

11. The apparatus of claim 1, wherein said display unit is configured to display said first image and said second image such that said first image and said second image are simultaneously perceived by both eyes of the observer.

12. A method for determining visual impressions for a wearer of spectacles having polarizing spectacle lenses, the method comprising the steps of:
   providing a first image having a motif and a first polarization direction corresponding thereto;
   providing a second image having said motif and a second polarization direction corresponding thereto and different from said first polarization direction; and,
   executing computer program code via a processor wherein the computer program code controls a display unit and causes the display unit to display said first image with light polarized in said first polarization direction and said second image with light polarized in said second polarization direction in overlapping presentation so as to cause said motif of said first image and said motif of said second image to mutually coincide identically as to shape and so as to cause said first image and said second image to be perceived simultaneously by the wearer, wherein the computer program code is stored on a non-transitory computer readable medium.

13. The method of claim 12, wherein a photographic recording of a camera having a polarization filter arranged ahead thereof and defining a first polarization axis is used as a first image; and, a photographic recording of a camera having a polarization filter arranged ahead thereof and defining a second polarization axis different from said first polarization axis is used as a second image.

14. The method of claim 12, wherein a photographic recording of a camera having a polarization filter arranged ahead thereof and defining a first polarization axis is used as a first image.

15. The method of claim 12, wherein a photographic recording of a camera having a polarization filter arranged ahead thereof and defining a second polarization axis is used as a second image.

16. The method of claim 12, wherein said first image and said second image differ in at least one optical characteristic.

17. The method of claim 16, wherein said optical characteristic is selected from the group including contrast, brightness, saturation and hue.

18. The method of claim 12, wherein said first image displayed is comprised of first image points arranged in the manner of fields of a single one of the colors of a chess board pattern and said second image displayed is comprised of second image points arranged in the manner of fields of another color of the chess board pattern.

19. The method of claim 12, wherein said first image is comprised of image points arranged in the manner of the fields of a chess board pattern and said second image is comprised of same image points; each of the image points displayed contains the information of corresponding image points of the first image and the information of corresponding image points of the second image; and, wherein a polarization direction corresponds to a vector addition of polarization direction vectors of the corresponding image points of the first image and of the second image which polarization direction vectors consider the intensity.

20. The method of claim 12, wherein said first polarization direction is aligned horizontally and said second polarization direction is aligned vertically.

21. The method of claim 12, further comprising the step of positioning the wearer to view the displayed images in superposed display selectively with the naked eye and/or through said spectacles having non-polarizing spectacle lenses and/or through spectacles having said polarizing spectacle lenses.

22. The method of claim 21, wherein the polarizing spectacle lenses are phototropic spectacle lenses and light sources are switched on activating the phototropic spectacle lenses.

23. An apparatus for demonstrating visual impressions for a wearer of spectacles having polarizing spectacle lenses, the apparatus comprising:
- a memory for making available a first image having a motif and a first polarization direction corresponding thereto;
- a memory for making available a second image having said motif and a second polarization direction corresponding thereto and different from said first polarization direction; and,
- a display unit;
- computer program code which, when executed by a processor, controls said display unit and causes said first image with light polarized in said first polarization direction and said second image with light polarized in said second polarization direction to be displayed on said display unit in overlapping presentation so as to cause said motif of said first image and said motif of said second image to mutually coincide identically as to shape and to be perceived simultaneously by the wearer, wherein one of said first image and said second image shows said motif as said motif is perceived with polarizing spectacles and the other one of said first image and said second image is chosen so as to cause said overlapping presentation to show said motif as it is perceived without polarizing spectacles.

24. A method for determining visual impressions for a wearer of spectacles having polarizing spectacle lenses, the method comprising the steps of:
- providing a first image having a motif and a first polarization direction corresponding thereto;
- providing a second image having said motif and a second polarization direction corresponding thereto and different from said first polarization direction; and,
- executing computer program code via a processor wherein the computer program code controls a display unit and causes the display unit to display said first image with light polarized in said first polarization direction and said second image with light polarized in said second polarization direction in overlapping presentation so as to cause said motif of said first image and said motif of said second image to mutually coincide identically as to shape and to be perceived simultaneously by the wearer, wherein one of said first image and said second image show said motif as said motif is perceived with polarizing spectacles and the other one of said first image and said second image is chosen so as to cause said overlapping presentation of said first image and said second image to show said motif as it is perceived without polarizing spectacles, wherein the computer program code is stored on a non-transitory computer readable medium.

* * * * *